US010731718B2

(12) United States Patent
Satoh et al.

(10) Patent No.: US 10,731,718 B2
(45) Date of Patent: Aug. 4, 2020

(54) VEHICLE DISC BRAKE

(71) Applicant: NISSIN KOGYO CO., LTD., Tomi, Nagano (JP)

(72) Inventors: Hiromasa Satoh, Tomi (JP); Takashi Ono, Tomi (JP)

(73) Assignee: Nissin Kogyo Co., Ltd., Nagano (JP)

( * ) Notice: Subject to any disclaimer, the term of this patent is extended or adjusted under 35 U.S.C. 154(b) by 17 days.

(21) Appl. No.: 16/094,027

(22) PCT Filed: Apr. 14, 2017

(86) PCT No.: PCT/JP2017/015326
§ 371 (c)(1),
(2) Date: Oct. 16, 2018

(87) PCT Pub. No.: WO2017/183585
PCT Pub. Date: Oct. 26, 2017

(65) Prior Publication Data
US 2019/0120306 A1  Apr. 25, 2019

(30) Foreign Application Priority Data

Apr. 18, 2016 (JP) ................................ 2016-083190

(51) Int. Cl.
*F16D 65/092* (2006.01)
*F16D 65/095* (2006.01)
(Continued)

(52) U.S. Cl.
CPC ....... *F16D 65/095* (2013.01); *F16D 65/0068* (2013.01); *F16D 65/092* (2013.01);
(Continued)

(58) Field of Classification Search
CPC .. F16D 65/095; F16D 65/0068; F16D 65/092; F16D 65/0971; F16D 65/18; F16D 2125/06; F16D 2250/0084
See application file for complete search history.

(56) References Cited

U.S. PATENT DOCUMENTS 4,809,825 A * 3/1989 Oltmanns, Jr. ....... F16D 65/092
188/73.31
5,427,213 A * 6/1995 Weiler ................ F16D 65/0006
188/250 E (Continued)

FOREIGN PATENT DOCUMENTS

CN 102007315 A 4/2011
CN 103775544 A 5/2014
(Continued)

OTHER PUBLICATIONS

Official Communication dated Jul. 22,2019 issued in the corresponding Chinese Patent Application No. 201780024139.1.

*Primary Examiner* — Thomas W Irvin
(74) *Attorney, Agent, or Firm* — Carrier Blackman & Associates, P.C.; William D. Blackman; Joseph P. Carrier

(57) ABSTRACT

For a vehicle disc brake, a piston-side first friction pad is provided with at least one protrusion on a piston-contacting section that excludes the central axis line of the piston and the piston is provided with an engagement hole capable of engaging with the protrusion. Symmetric with the piston-side first friction pad with a brake disc therebetween, a reaction pawl-side second friction pad is provided with a protrusion. As a result, it is possible to provide a vehicle disc brake in which the first friction pad and the second friction pad are both made to have a protrusion, reducing the possibility of incorrect assembly, and the friction pads themselves are made to be used in common, facilitating product management.

3 Claims, 6 Drawing Sheets

(51) Int. Cl.
  *F16D 65/18* (2006.01)
  *F16D 65/097* (2006.01)
  *F16D 65/00* (2006.01)
  *F16D 125/06* (2012.01)

(52) U.S. Cl.
  CPC ......... *F16D 65/0971* (2013.01); *F16D 65/18* (2013.01); *F16D 2125/06* (2013.01); *F16D 2250/0084* (2013.01)

(56) References Cited

U.S. PATENT DOCUMENTS

| | | | | |
|---|---|---|---|---|
| 5,509,508 A * | 4/1996 | Evans | ................. | F16D 65/0006 188/73.31 |
| 5,842,546 A * | 12/1998 | Biswas | .............. | F16D 65/0006 188/73.37 |
| 6,170,618 B1 * | 1/2001 | Rueckert | ............ | F16D 65/0979 188/73.37 |
| 6,634,469 B2 * | 10/2003 | Storzel | ................. | F16D 65/097 188/205 A |
| 6,913,120 B2 * | 7/2005 | Bosco | ................... | F16D 65/092 188/250 E |
| 7,152,717 B2 * | 12/2006 | Lelievre | .............. | F16D 65/0006 188/73.38 |
| 7,926,627 B2 * | 4/2011 | Wake | ................... | F16D 65/092 188/250 B |
| 8,544,618 B2 * | 10/2013 | Klimt | .................. | F16D 65/0006 188/250 B |
| 9,239,088 B2 | 1/2016 | Roehling | | |
| 9,377,069 B2 * | 6/2016 | Naito | ................... | F16D 55/225 |
| 9,587,693 B2 | 3/2017 | Wu et al. | | |
| 9,651,102 B2 * | 5/2017 | Hoxie | ................ | F16D 65/0006 |
| 9,664,244 B2 * | 5/2017 | Osada | ................. | F16D 55/225 |
| 10,041,554 B2 * | 8/2018 | Ishikawa | ............... | F16D 65/092 |
| 10,352,384 B2 * | 7/2019 | Satoh | ...................... | F16D 65/18 |
| 2018/0094682 A1 * | 4/2018 | Satoh | ................... | F16D 65/092 |

FOREIGN PATENT DOCUMENTS

| | | |
|---|---|---|
| CN | 104373489 A | 2/2015 |
| JP | S58-211032 A | 12/1983 |
| JP | H07-22502 Y2 | 5/1995 |

\* cited by examiner

VEHICLE DISC BRAKE

TECHNICAL FIELD

The present invention relates to a vehicle disc brake that has pressurizing means for applying a driving force in an axial direction to a piston using a rotary force about a central axis line.

BACKGROUND ART

PTL 1 discloses a disc brake. The disc brake has a mechanical parking brake. The mechanical parking brake of PTL 1 has a protrusion on a first friction pad close to a piston. The protrusion engages with the piston in a position displaced from a central axis line of the piston. Such an effect of the protrusion restricts the rotation of the piston.

CITATION LIST

Patent Literature

PTL 1: JP-UM-B-7-22502

SUMMARY OF INVENTION

Technical Problem

In a structure having such a parking brake mechanism, since a shim is generally locked to the pad by pawls at both ends in the disc radial direction of the shim to restrict rotation of the piston, the first friction pad close to an action part is provided with a protrusion that engages with the piston and the shim is provided with an insertion hole into which the protrusion of the pad can be inserted, but a second friction pad close to a reaction pawl does not have a rotation restricting mechanism for the piston. Accordingly, when the second friction pad is incorrectly assembled in place of the first friction pad, the piston may rotate.

An object of the invention is to reduce the possibility of incorrect assembly, by making the first friction pad and the second friction pad each have a protrusion, and to facilitate product management by making the friction pads themselves interchangeably usable in common.

Solution to Problem

According to a first aspect of the invention, there is provided a vehicle disc brake including a brake disc; a first friction pad and a second friction pad facing each other with the brake disc sandwiched therebetween; a caliper body having a cylinder hole and a reaction pawl disposed on back sides of the first friction pad and the second friction pad, respectively; a piston slidably fitted to the cylinder hole, the piston being capable of pressing the first friction pad; and pressurizing means capable of pressurizing the piston, in which the first friction pad close to the piston has at least one protrusion in a piston-contacting section excluding a central axis line of the piston, the piston has an engagement hole engageable with the protrusion, and the second friction pad close to the reaction pawl has a protrusion symmetrically with respect to the first friction pad close to the piston with the brake disc sandwiched therebetween.

According to a second aspect, in addition to the structure of the first aspect, the vehicle disc brake includes shim plates attached to back plates of the first friction pad close to the piston and the second friction pad close to the reaction pawl, respectively, in which the shim plates have insertion holes into which the protrusion is insertable.

According to a third aspect, in addition to the structure of the second aspect, the insertion hole is formed as a long hole extending along a straight line connecting the protrusion and the central axis line of the piston and an inner diameter along a minor axis of the long hole is substantially the same as an outer diameter of the protrusion to be inserted into the long hole.

Advantageous Effects of Invention

According to the first aspect, since the protrusion functions as a piston rotation stopper and another protrusion is provided on the second friction pad as in the first friction pad, these friction pads have the same structure.

According to the second aspect, since the shims are provided with the insertion holes into which the protrusion can be inserted when the shims are attached, a shim rotation stopper is obtained.

According to the third aspect, since the insertion hole is formed as the long hole extending along the straight line connecting the protrusion and the central axis line of the piston, the dimensional tolerances between the friction pads and the shim plates can be affordably absorbed in the longitudinal direction of the long hole.

REFERENCE SIGNS LIST

Figure 1:
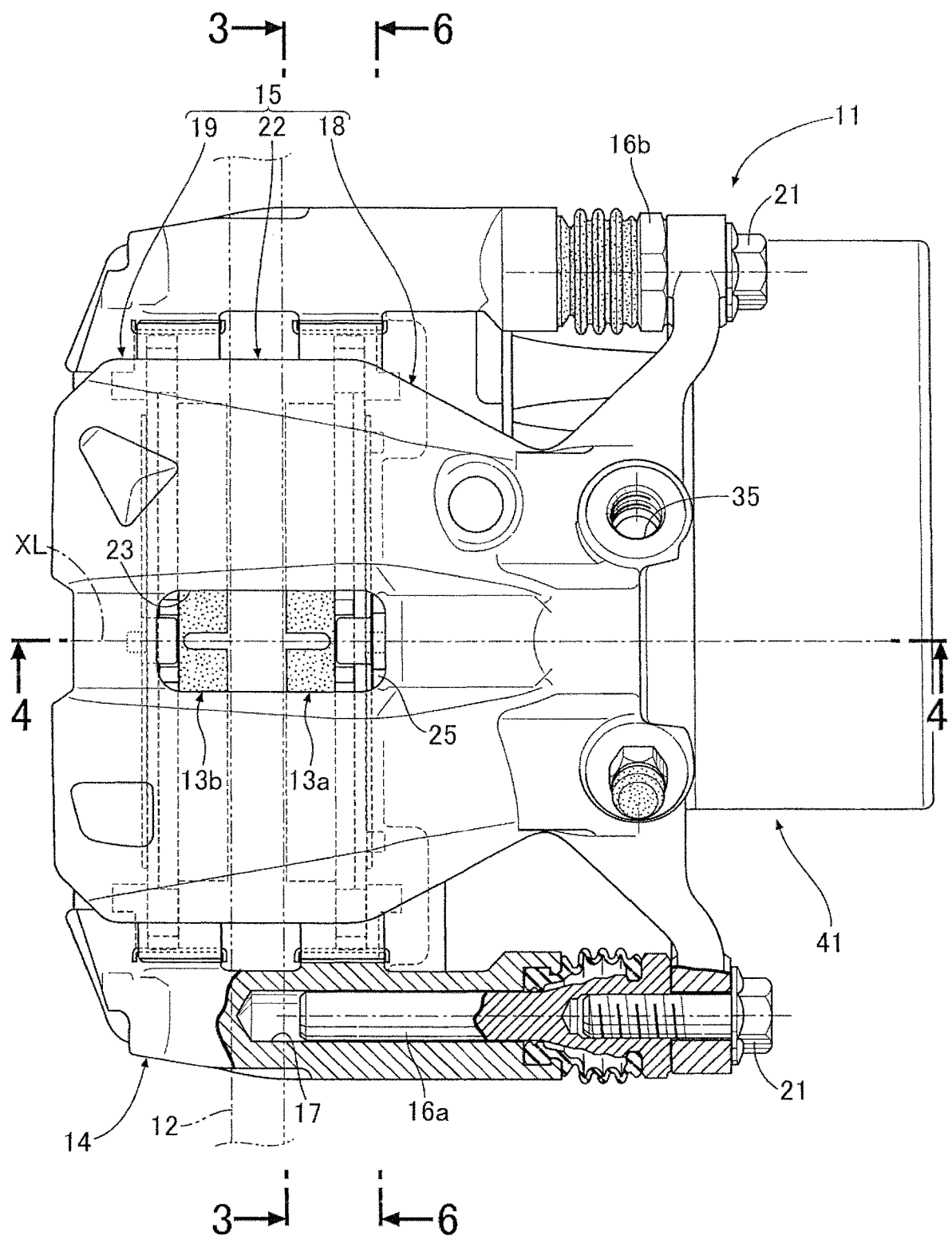
FIG. 1 is a plan view schematically illustrating a vehicle disc brake according to an embodiment of the invention (first embodiment).

11: vehicle disc brake
12: brake disc
13a: first friction pad
13b: second friction pad
15: caliper body
19: reaction pawl
25: piston
28a: back plate
28b: back plate
29a: first shim plate (shim plate)
29b: second shim plate (shim plate)
31: cylinder hole
43: electric motor constituting pressurizing means
44: motion conversion mechanism constituting pressurizing means
57: third insertion hole (insertion hole)
59: central line
62a: first protrusion (protrusion)
64: second protrusion (protrusion)
Px: central axis line

DESCRIPTION OF EMBODIMENTS

An embodiment of the invention will be described with reference to the attached drawings.

First Embodiment

FIG. 1 schematically illustrates a vehicle disc brake 11 according to an embodiment of the invention. The vehicle disc brake 11 includes a brake disc 12 that rotates about an axis XL of an axle shaft integrally with a wheel of a rundle (not illustrated) and a bracket 14 that supports a first friction pad 13a and a second friction pad 13b that face the disc surfaces of the brake disc 12. The bracket 14 is fixed to a vehicle body.

A caliper body 15 is coupled by bolts to the bracket 14 via a pair of slide pins 16a and 16b extending in parallel to the axis XL of the axle shaft. The bracket 14 is provided with pin holes 17 (only one of them is illustrated) that receive the slide pins 16a and 16b while guiding the slide pins 16a and 16b along the axial direction. The slide pins 16a and 16b are slidable and fix the caliper body 15 slidably to the bracket 14 in parallel to the axis XL of the axle shaft.

The caliper body 15 has an action part 18 and a reaction pawl 19 that are disposed in a space between the slide pins 16a and 16b. The action part 18 is fixed detachably by bolts 21 via the slide pins 16a and 16b. The action part 18 is disposed at the back of the first friction pad 13a. The reaction pawl 19 is disposed at the back of the second friction pad 13b. The reaction pawl 19 is connected to the action part 18 by a bridge 22 that straddles the edge the brake disc 12 in a direction parallel to the axis XL of the axle shaft. An inspection window 23 is partitioned in the bridge 22. When the friction situations and the like of the first friction pad 13a and the second friction pad 13b are inspected, the first friction pad 13a and the second friction pad 13b can be visually inspected through the inspection window 23.

An electric actuator 41 that generates a pressing force for pressing the first friction pad 13a and the second friction pad 13b against the brake disc 12 is coupled to the caliper body 15. A piston 25 disposed at the back of the first friction pad 13a applies the pressing force for pressing the first friction pad 13a against the disc surface of the brake disc 12.

Figure 2:
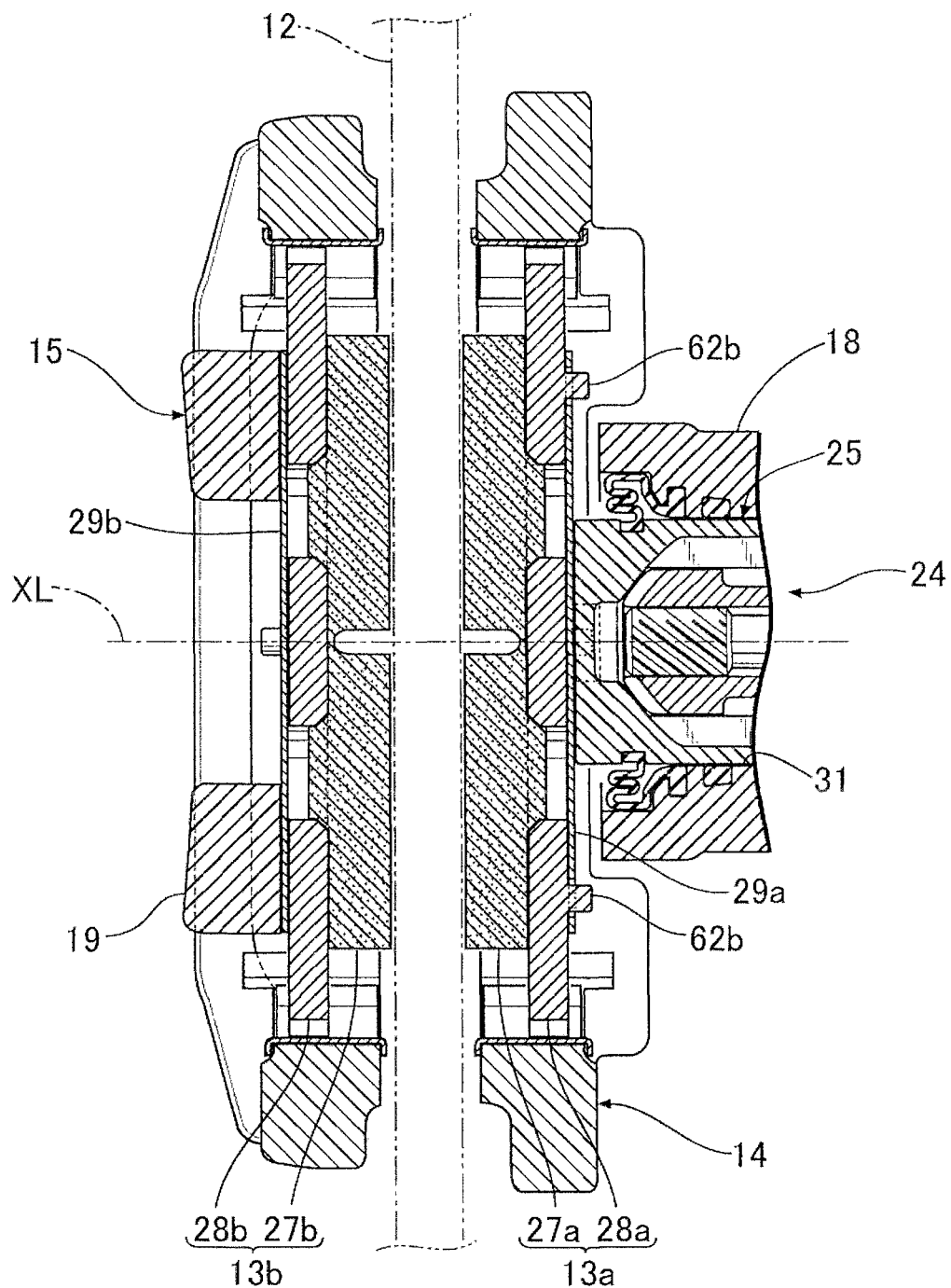
FIG. 2 is a cross sectional view taken along a plane, parallel to a tangent line of a brake disc, that includes a central axis line of a piston (first embodiment).

As illustrated in FIG. 2, the first friction pad 13a includes a lining 27a that makes contact with a disc surface of the brake disc 12 and a metal back plate 28a that backs the lining 27a. Similarly, the second friction pad 13b includes a lining 27b that makes contact with a disc surface of the brake disc 12 and a metal back plate 28b that backs the lining 27b. A first shim plate 29a and a second shim plate 29b are superimposed on the back plates 28a and 28b of the first friction pad 13a and the second friction pad 13b, respectively. As described later, the first shim plate 29a and the second shim plate 29b are elastically mounted on the back plates 28a and 28b of the friction pads 13a and 13b.

The piston 25 is housed in a cylinder hole 31 formed in the action part 18. When the piston 25 moves forward in the axial direction, the first friction pad 13a is pressed against the disc surface of the brake disc 12. The reaction force displaces the caliper body 15 and the reaction pawl 19 of the caliper body 15 presses the second friction pad 13b against the disc surface of the brake disc 12. In this way, the brake disc 12 is sandwiched between the first friction pad 13a and the second friction pad 13b. The forward impelling force of the piston 25 generates the braking forces of the first friction pad 13a and the second friction pad 13b.

Figure 3:
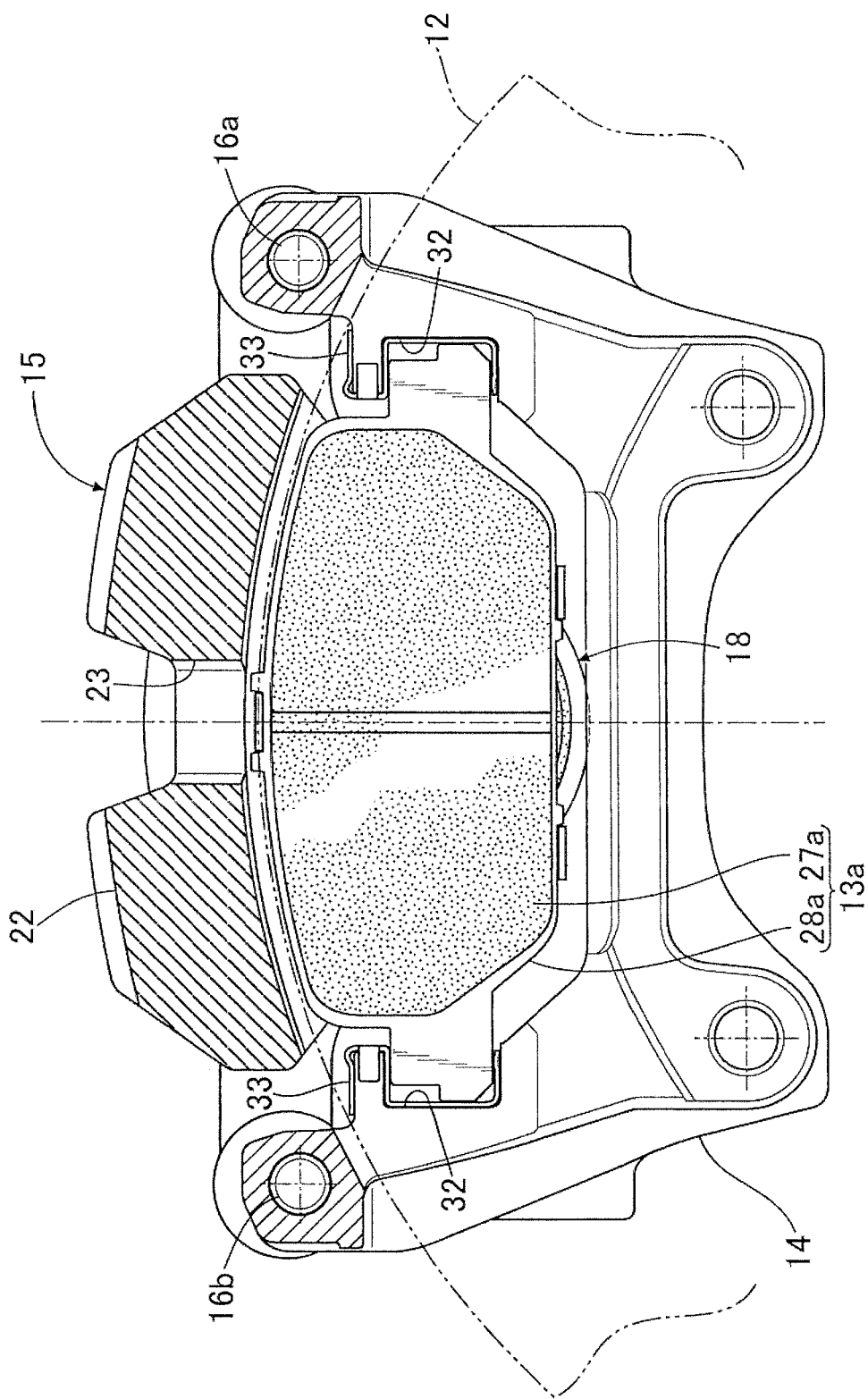
FIG. 3 is a cross sectional view taken along line 3-3 in FIG. 1 (first embodiment).

As illustrated in FIG. 3, support grooves 32 are partitioned on the bracket 14 in the circumferential direction of the brake disc 12 on both sides of the back plates 28a and 28b. Both ends of the back plates 28a and 28b are inserted into the support grooves 32 via guide plates 33. The support grooves 32 guide the movement of the back plates 28a and 28b in parallel to the axis XL of the axle shaft. The support grooves 32 block the displacement of the back plates 28a and 28b in the circumferential direction of the brake disc 12.

Figure 4:
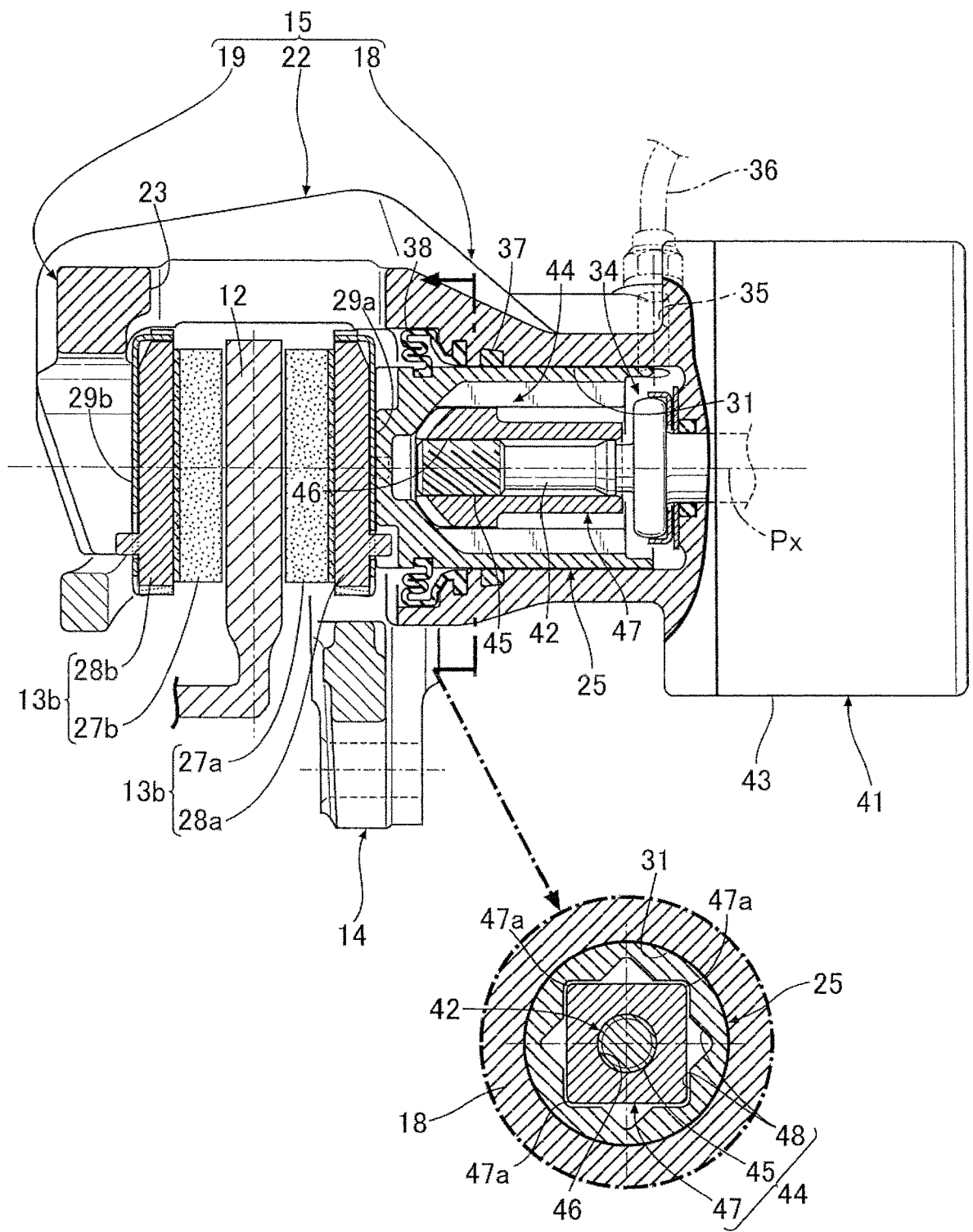
FIG. 4 is a cross sectional view taken along line 4-4 in FIG. 1 (first embodiment).

As illustrated in FIG. 4, a hydraulic chamber 34 is partitioned between the inside of the piston 25 and the bottom wall of the cylinder hole 31. A hydraulic port 35 for guiding the hydraulic pressure to the hydraulic chamber 34 is partitioned in the action part 18. An output port of a master cylinder (not illustrated) is connected to the hydraulic port 35 via a hydraulic conduit 36. The hydraulic pressure is introduced from the master cylinder to the hydraulic chamber 34 in this way. The piston 25 moves forward by receiving the hydraulic pressure from the master cylinder. An annular piston seal 37, which makes contact with the outer peripheral surface of the piston 25, is attached to the inner surface of the cylinder hole 31. An annular dust boot 38 is attached between the opening end of the cylinder hole 31 and the piston 25.

A working shaft 42 of the electric actuator 41 is coupled to the piston 25. The electric actuator 41 rotationally drives the working shaft 42 about the axis. An electric motor 43 is coupled to the working shaft 42 via a deceleration mechanism (not illustrated). The electric motor 43 generates a rotary driving force according to energization. A motion conversion mechanism 44 is coupled between the piston 25 and the working shaft 42. The motion conversion mechanism 44 converts the rotary motion of the working shaft 42 to the linear motion of the piston 25. When a switch for a parking brake lever is operated, the rotary driving force of the electric motor 43 is transmitted to the working shaft 42 and the piston 25 moves forward according to the rotation of the working shaft 42.

The motion conversion mechanism 44 includes male screw grooves 45 formed in the outer peripheral surface of the working shaft 42, a nut member 47 having a female screw 46 that engages with the male screw grooves 45, and a set of engaging grooves 48 that guides the movement of the nut member 47 in the axial direction. The nut member 47 is pushed by the piston 25 from the back at the front end. The front end of the nut member 47 has an appearance of a square pole concentric with the piston 25. Ridges 47a of the square pole engage with the engaging grooves 48, respectively. Although the nut member 47 slides in the axial direction with respect to the piston 25 according to such engagement, the relative rotation of the nut member 47 about the central axis with respect to the piston 25 is blocked. The electric motor 43, the working shaft 42, and the motion conversion mechanism 44 constitute the pressurizing means that applies a driving force in the axial direction to the piston 25 using a rotary force about a central axis line Px of the working shaft 42. The central axis line Px of the working shaft 42 coincides with the central axis line of the piston 25.

Figure 5:
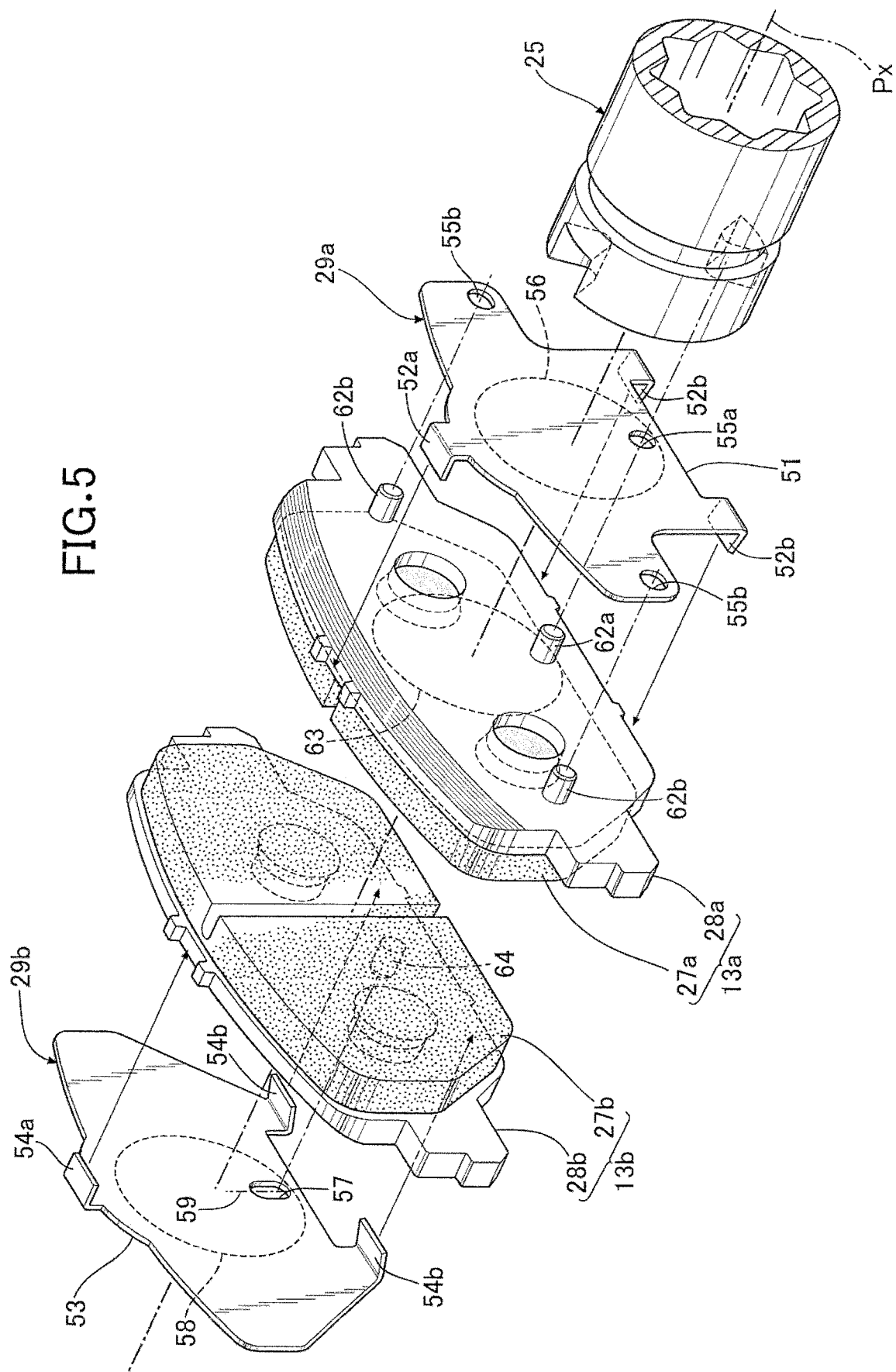
FIG. 5 is an exploded perspective view illustrating first and second friction pads and first and second shim plates (first embodiment).

As illustrated in FIG. 5, the first shim plate 29a has a plate-like main body 51 to be superimposed on the back plate 28a of the first friction pad 13a. An upper pawl 52a is formed by bending at an upper edge of the main body 51. A pair of lower pawls 52b is formed by bending at a lower edge of the main body 51. The back plate 28a is elastically sandwiched between the upper pawl 52a and the lower pawls 52b. The first shim plate 29a is supported by the back plate 28a in this way. Similarly, the second shim plate 29b has a plate-like main body 53, an upper pawl 54a, and lower pawls 54b.

A first insertion hole 55a as a set-in hole is opened in the main body 51 of the first shim plate 29a. The first insertion hole 55a divides a discoid space having a central axis line in parallel to the central axis line Px. The central axis line of the first insertion hole 55a is set on a virtual plane including, for example, the central axis line Px of the piston 25 and the axis XL of the axle shaft. The first insertion hole 55a is disposed along the contour of a projected image 56 within the projected image 56 of the piston 25 projected onto the first shim plate 29a. The projected image 56 only needs to be drawn by the contour line of the piston 25 that is subjected to parallel translation in parallel to the central axis line Px. In this way, the first insertion hole 55a is located in a position displaced from the central axis line Px of the piston 25. The first shim plate 29a only needs to be punched and formed from, for example, one metal plate.

A pair of second insertion holes 55b as set-in holes is also opened in the main body 51 of the first shim plate 29a. The second insertion holes 55b are disposed in a position most distant from the central axis line Px of the piston 25. The second insertion holes 55b only need to be located outward of the action part 18 in a radial direction of the piston 25.

Similarly, a third insertion hole 57 as a set-in hole is also opened in the main body 53 of the second shim plate 29b. The positional relationship between the third insertion hole 57 and the contour of the back plate 28b of the second friction pad 13b reflects the positional relationship between the first insertion hole 55a of the first shim plate 29a and the contour of the back plate 28a of the first friction pad 13a. Accordingly, the third insertion hole 57 is disposed along the contour of a projected image 58 within the projected image 58 of the piston 25 projected onto the second shim plate 29b. The projected image 58 only needs to be drawn by the contour line of the piston 25 that is subjected to parallel translation in parallel to the central axis line Px. The third insertion hole 57 has a central line 59 within a virtual plane including the central axis line Px of the piston 25 and is formed as a long hole extending along the central line 59. Here, the virtual plane includes the central axis line Px and the axis
XL of the axle shaft. The long hole only needs to be shaped by the track of the first insertion hole 55a that linearly moves in parallel to the virtual plane. The second shim plate 29b is punched and formed by, for example, one metal plate.

The first friction pad 13a has at least one first protrusion 62a in a piston-contacting section excluding the central axis line Px of the piston 25 and has inserting protrusions 62b projecting vertically from the back plate 28a. The first protrusion 62a is formed by a small shaft having an axis parallel to the central axis line Px of the piston 25. The first protrusion 62a is inserted into the first insertion hole 55a of the first shim plate 29a and penetrates through the first shim plate 29a. In this way, the first protrusion 62a engages with the first shim plate 29a through an edge that shapes the contour of the first insertion hole 55a. The first protrusion 62a projects from the back surface of the first shim plate 29a.

The inserting protrusions 62b are formed by small shafts having axes parallel to the central axis line Px of the piston 25. The inserting protrusions 62b are inserted into the second insertion holes 55b of the first shim plate 29a. The positional relationship between the inserting protrusions 62b and a projected image 63 of the piston 25 projected onto the back plate 28a of the first friction pad 13a reflects the positional relationship between the second insertion holes 55b and the projected image 56. The projected image 63 only needs to be drawn by the contour line of the piston 25 that is subjected to parallel translation in parallel to the central axis line Px.

The second friction pad 13b has a second protrusion 64 symmetrically with respect to the first friction pad 13a with the brake disc 12 sandwiched therebetween. The second protrusion 64 is formed by a small shaft having an axis parallel to the central axis line Px of the piston 25. The second protrusion 64 is inserted into the third insertion hole 57 of the second shim plate 29b and penetrates through the second shim plate 29b. In this way, the second protrusion 64 engages with the second shim plate 29b through an edge that shapes the contour of the third insertion hole 57. The second protrusion 64 projects from the back surface of the second shim plate 29b.

Figure 6:
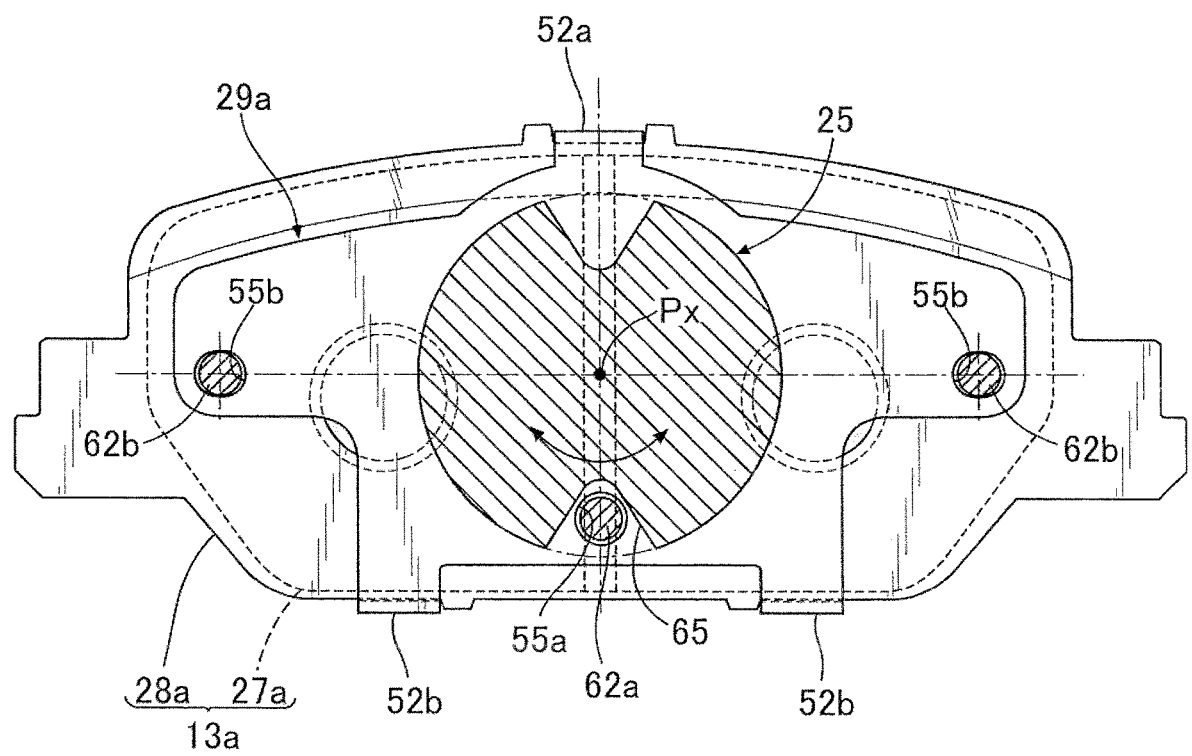
FIG. 6 is a cross sectional view taken along line 6-6 in FIG. 1 (first embodiment).

As illustrated in FIG. 6, an engagement hole 65 is formed in the end surface of the piston 25 so as to correspond to the first protrusion 62a. The first protrusion 62a is disposed in a position displaced from the central axis line Px of the piston 25. The first protrusion 62a engages with the piston 25 when the piston 25 rotates about the central axis line Px. Accordingly, the first protrusion 62a blocks the rotation of the piston 25 about the central axis line Px. The engagement hole 65 is opened in the outer peripheral surface of the piston 25.

Next, the effect of the embodiment will be described. When a braking operation is performed during travel of a vehicle, a brake oil pressure is introduced from the master cylinder to the hydraulic chamber 34. When the hydraulic pressure of the hydraulic chamber 34 rises, the piston 25 moves forward. When the piston 25 moves forward, the first friction pad 13a is pressed against the disc surface of the brake disc 12. The reaction force displaces the caliper body 15 and the reaction pawl 19 of the caliper body 15 presses the second friction pad 13b against the disc surface of the brake disc 12. In this way, the brake disc 12 is sandwiched between the first friction pad 13a and the second friction pad 13b and a braking force is generated.

In addition, when, for example, a switch for a parking brake lever is operated, electric power is supplied to the electric actuator 41. The electric motor 43 generates a rotary driving force according to the electric power. The rotary force of the electric motor 43 is converted by the effect of the motion conversion mechanism 44 to the forward driving force for the piston 25. The piston 25 moves forward in this way to apply a parking brake.

When, for example, the first friction pad 13a and the second friction pad 13b are replaced, the first friction pad 13a and the second friction pad 13b are removed from the bracket 14. Even if the second friction pad 13b is assembled to the action part 18 in error at this time, since the first protrusion 62a is formed symmetrically with respect to the second protrusion 64 with the brake disc 12 sandwiched therebetween and the second protrusion 64 on the second friction pad 13b reflects the positional relationship between the contour of the first friction pad 13a and the first protrusion 62a, the second protrusion 64 can enter the engagement hole 65 of the piston 25. The effect of the second protrusion 64 couples the second friction pad 13b and the piston 25 to each other about the central axis line Px of the piston 25. Such an effect of the second protrusion 64 restricts the rotation of the piston 25. The rotation of the working shaft 42 is surely converted to displacement in the axial direction of the nut member 47 via the male screw grooves 45 and the female screw 46. The braking force is surely obtained in a parking brake state. Individual components can be used in common using the first friction pad 13a and the second friction pad 13b while achieving a piston rotation stopper using the second protrusion 64.

In the embodiment, when the first friction pad 13a is assembled to the action part 18, the relative displacement between the first friction pad 13a and the first shim plate 29a is restricted based on engagement between the first protrusion 62a and the first insertion hole 55a and engagement between the inserting protrusions 62b and the second insertion holes 55b. On the other hand, when the second friction pad 13b in place of the first friction pad 13a is assembled to the action part 18 in error, the second protrusion 64 penetrates through the second shim plate 29b and engages with the piston 25. The effect of the third insertion hole 57 restricts the relative displacement between the second friction pad 13b and the second shim plate 29b. The insertion holes 55a, 55b, and 57 function as piston stoppers for the first and second shim plates 29a and 29b.

Here, the third insertion hole 57 is formed as a long hole (here, either long hole or slot, having the central line 59 within a virtual plane including the central axis line Px of the piston 25 and extending along the central line 59) extending along a line parallel to the straight line connecting the first protrusion 62a and the central axis line Px of the piston 25. The second shim plate 29b receives the second protrusion 64 through the long hole. Accordingly, the dimensional tolerances between the friction pads 13a and 13b and the shim plates 29a and 29b can be affordably absorbed in the longitudinal direction of the long hole. Here, as the size of long hole in the circumferential direction about the central axis line Px of the piston 25 reduces, the relative displacement between the second shim plate 29b and the second friction pad 13b is suppressed to a minimum and the allowable range of the positional deviation and the dimensional deviation in the radial direction of the piston 25 is widened, thereby improving yields and facilitating assembly work.

The invention claimed is:

1. A vehicle disc brake assembly comprising:
   a brake disc;
   a first friction pad and a second friction pad facing each other with the brake disc sandwiched therebetween;
   a caliper body having a cylinder hole formed therein and a reaction pawl disposed on back sides of the first friction pad and the second friction pad, respectively;
   a piston slidably fitted to the cylinder hole, the piston being capable of pressing the first friction pad; and
   a pressurizing device capable of pressurizing the piston,
   wherein the first friction pad is disposed close to the piston, and has at least one protrusion extending outwardly thereon in a piston-contacting section spaced away from a central axis line of the piston,
   the piston has an engagement hole formed in an outer peripheral surface thereof, the engagement hole being engageable with the protrusion in a manner so as to block rotation of the piston about its central axis, and
   the second friction pad close to the reaction pawl has a protrusion extending outwardly thereon and disposed symmetrically with respect to the protrusion of the first friction pad, wherein the first and second friction pads are configured so as to be usable interchangeably.

2. The vehicle disc brake assembly according to claim 1, further comprising:
   shim plates attached to back plates of the first friction pad close to the piston and the second friction pad close to the reaction pawl, respectively,
   wherein the shim plates have insertion holes into which the corresponding protrusion is insertable.

3. The vehicle disc brake assembly according to claim 2, wherein:
   the insertion hole is formed as a slot extending along a line extending parallel with a straight line connecting the protrusion and the central axis line of the piston, and
   an inner diameter of the slot, along a minor axis of the slot, is substantially the same as a width of the protrusion to be inserted into the slot.

* * * * *